April 9, 1935. T. J. DYKEMA Re. 19,520

BOTTLE CLOSURE AND LIQUID DROPPER

Original Filed Feb. 7, 1931

WITNESSES

A. B. Wallace.

F. B. Slick.

INVENTOR

Tunis J. Dykema by Brown & Critchlow his attorneys.

Reissued Apr. 9, 1935 Re. 19,520

UNITED STATES PATENT OFFICE 19,520

BOTTLE CLOSURE AND LIQUID DROPPER

Tunis J. Dykema, Pittsburgh, Pa.

Original No. 1,843,812, dated February 2, 1932, Serial No. 514,167, February 7, 1931. Application for reissue January 29, 1935, Serial No. 3,985

9 Claims. (Cl. 221—148)

This invention relates to combined bottle stoppers and liquid droppers.

Certain disadvantages attend the use of the usual forms of liquid, or medicine, droppers. These being separate from the container with whose liquid content they are to be used, they may be misplaced readily, become contaminated, or be broken. For these and other reasons it has been proposed to combine such droppers with the container closures. The devices available for this purpose prior to my invention, however, have been subject to various disadvantages which have militated against their wide use. For example, in some forms of those devices the dropper was associated with a rubber stopper. Such stoppers are hard to manipulate. Also, some liquids and medicaments may cause loosening of the stopper and impairing the seal, or making it difficult or impossible to replace it after being removed from the bottle. Other forms suggested made use of more or less complicated constructions, and were thus undesirable. For example, some of them made use of a cap member which had to be removed to expose the dropper bulb, and for this reason they were impractical and inconvenient. Such cap members are made in most cases from cork, metal, or rubber, and in many cases these materials have an injurious effect on certain liquids and medicaments, and for this reason they are undesirable.

It is among the objects of this invention to provide a combined stopper and dropper unit which is of simple, sturdy and inexpensive construction, efficiently seals the container, in which the dropper and closure are removed as a unit by a single manipulation, and which minimizes or overcomes many of the disadvantages of the prior art structures. Other objects and advantages will appear hereinafter.

Figure 1:
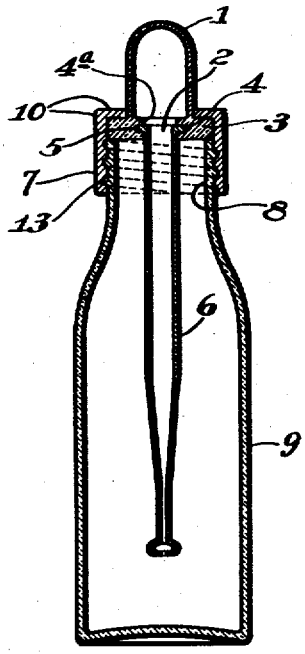
Figure 2:
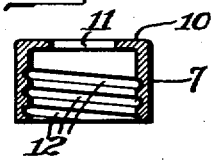
Figure 3:
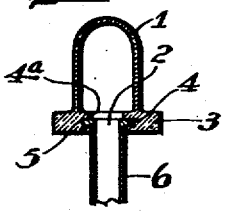

The preferred embodiment of the invention is shown in the accompanying drawing, in which Fig. 1 is a cross section of a bottle showing the stopper-dropper in place; Figs. 2 and 3 are cross sections through the cap and bulb members, showing details of construction.

The device provided by this invention comprises a cap member adapted to engage the neck of a container, and a dropper member having a portion adapted to form the sole seal for the container, thus eliminating the use of stoppers having a portion going inside of the neck of the container. These parts are associated to act in unitary fashion so far as their application to or removal from the container is concerned.

Referring to the drawing, the dropper member comprises an elastic bulb 1, provided at one end with the usual opening 2 which is surrounded by an outwardly extending flange 3. A groove 4 formed peripherally in the inner annular surface 4a of flange 3 receives and engages a bead 5 formed on the upper end of a tubular dropper body member 6. This body member is preferably made from glass, and it may assume any of the customary forms used for droppers.

The cap member comprises a downwardly extending skirt 7 adapted to engage neck 8 of a container 9, and an inwardly extending flange 10 which forms a top having an aperture 11. The cap is formed of rigid material, for example glass or molded plastic, and is provided with threads 12 which cooperate with complementary threads 13 formed on neck 8. Engagement of the neck by the cap may be effected other than by the screw threads shown, various means being available for this purpose.

The stopper-dropper is assembled for use by forcing bulb 1 upwardly through aperture 11 to seat flange 3 within the cap against top 10. Dropper body 6 being connected to bulb 1, as shown in Figs. 1 and 3, there is provided a unitary structure in which the bulb extends upwardly through, and the dropper body downwardly from, the cap.

Flange 3 is of such size as to make a tight frictional fit within the cap, and it lies between top flange 10 and the lip of neck 8 when the stopper-dropper is applied to the container. Upon screwing the cap down upon the neck flange 3 is pressed tightly against the neck lip and seals the container against leakage. As shown in Fig. 1 this flange forms the sole seal for the container, but because of the construction efficient sealing is assured.

It will be seen that as thus assembled and used there is provided a combined stopper-dropper which is applied, removed, and used as a unit. When the cap is unscrewed and lifted from the container it carries the dropper, which is then ready for immediate use, the bulb being exposed and always ready for sucking up and dropping liquid in the usual manner. The cap and dropper are always together, which eliminates the inconveniences of separate droppers. Also, the simplicity of construction and use, and the efficiency of the stopper-dropper provided by this invention substantially overcome the disadvantages of those available heretofore. Other advantages are that the invention eliminates the use of corks and the labor of applying them. An important feature is that it makes possible the use of smaller containers with a longer glass, so that the user can drain the contents more thoroughly and easily than in the case of containers generally used with separate droppers.

According to the provisions of the patent statutes, I have explained the principle and mode of operation of my invention and have illustrated and described what I now consider to represent its best embodiment. However, I desire to have it understood that, within the scope of the appended claims, the invention may be practiced otherwise than as specifically illustrated and described.

I claim:

1. The combination with a liquid container having a neck, of a combined closure and dropper associated removably as a unit with said neck and comprising a cap member having a downwardly extending neck-engaging skirt and a top flange extending inwardly from said skirt to form an apertured top, a dropper member comprising an elastic bulb having an outwardly extending sealing flange surrounding its lower open end, said sealing flange having a peripherally formed groove in its inner annular surface, and a downwardly extending tubular dropper body provided with a bead on its upper end engaging said groove, said bulb passing upwardly through the aperture in said cap with its sealing flange surrounded by said skirt and engaging the top of said cap to be frictionally engaged by said cap, and said flange forming with the lip of said neck the sole seal for the container when the neck is engaged by the cap.

2. The combination with a liquid container having a neck, of a combined closure and dropper associated removably as a unit with said neck and comprising a cap member having a downwardly extending neck-engaging skirt and a top flange extending inwardly from said skirt to form an apertured top, a dropper member comprising an elastic bulb having an outwardly extending sealing flange surrounding its open lower end, and a downwardly extending tubular dropper having its upper end associated with the lower end of said bulb, one of said ends being provided with a groove and the other of said ends being provided with a flange interengaging said groove, said bulb passing upwardly through the aperture in said cap with the sealing flange surrounded by said skirt and engaging the top of said cap to be frictionally engaged by said cap, and said flange forming with the lip of said neck the sole seal for the container when the neck is engaged by the cap.

3. A combined bottle closure and liquid dropper comprising a rigid cap having a central opening in it and adapted to fit over and form a cover for the top of a bottle and a liquid dropper consisting of an externally flanged elastic bulb having a dropper tube engaged in an open neck forming the bottom of the bulb, one of said tube and neck being provided with a groove and the other thereof being provided with a flange interengaging said groove, the external flange of the bulb being disposed about the region of the interengaging portions of the tube and neck to enhance the engagement therebetween and being of such diameter as to seat on the bottle to seal the same upon application of the cap thereto, said bulb being extended upwardly through the opening in said cap with the dropper tube projecting therebelow and the body of the bulb frictionally engaging the cap whereby adapting the dropper to move with the cap as a unit.

4. A combined bottle closure and liquid dropper comprising a rigid cap having a central opening in its top and a depending skirt on it adapting it to fit over and form a cover for the top of a bottle, and a liquid dropper consisting of an elastic bulb having a dropper tube engaged in an open neck forming the lower end of the bulb, said bulb being extended upwardly through the opening in the cap with the dropper tube projecting therebelow, said neck portion of the bulb having a flange formed integral therewith which is adapted to enhance the engagement between the dropper tube and the bulb and is also adapted to frictionally engage the skirt of the cap in such a way as to cause the cap and dropper to move as a unit when the cap is removed from the bottle and also forms a sealing gasket which is forced against the top of the bottle by the cap when the later is forced thereover.

5. A combined bottle closure and liquid dropper comprising a rigid cap having a central opening in it and adapted to fit over and form a cover for the top of a bottle and a liquid dropper consisting of an externally flanged elastic bulb having a dropper tube engaged in an open neck forming the bottom of the bulb, the flange of the bulb being of such diameter as to seat on the bottle to seal the same upon application of the cap thereto and being disposed substantially at the bottom of the bulb so that no substantial portion of the bulb extends down into the bottle, said bulb being extended upwardly through the opening in said cap with the dropper tube projecting therebelow and the body of the bulb frictionally engaging the cap whereby adapting the dropper to move with the cap as a unit.

6. A combined bottle closure and liquid dropper comprising a rigid cap having a central opening in it and adapted to fit over and form a cover for the top of a bottle and a liquid dropper consisting of an externally flanged elastic bulb having a dropper tube grippingly engaged in an open neck forming the bottom of the bulb and at the inside of the flange of the bulb whereby the flange enhances the engagement between the tube and neck, the flange being of such diameter as to seat on the bottle to seal the same upon application of the cap thereto, said bulb being extended upwardly through the opening in said cap with the dropper tube projecting therebelow and the body of the bulb frictionally engaging the cap whereby adapting the dropper to move with the cap as a unit.

7. A combined bottle closure and liquid dropper comprising a rigid cap having a central opening in it and adapted to fit over and form a cover for the top of a bottle and a liquid dropper consisting of an externally flanged elastic bulb having a dropper tube engaged in an open neck forming the bottom of the bulb, one of said tube and neck being provided with a groove and the other thereof being provided with a flange interengaging said groove, the external flange of the bulb being of such diameter as to seat on the bottle to seal the same upon application of the cap thereto, said bulb being extended upwardly through the opening in said cap with the dropper tube projecting therebelow and the body of the bulb frictionally engaging the cap whereby adapting the dropper to move with the cap as a unit.

8. A combined bottle closure and liquid dropper comprising a rigid cap having a central opening in it and adapted to fit over and form a cover for the top of a bottle and a liquid dropper consisting of an externally flanged elastic bulb having a dropper tube engaged in an open neck forming the bottom of the bulb, the diameter of said opening in the cap being at least approximately as great as the external diameter of the upper or squeezing portion of the bulb, one of said tube and neck being provided with a groove and the other thereof being provided with a flange interengaging said groove, the external flange of the bulb being of such diameter as to seat on the bottle to seal the same upon application of the cap thereto, said bulb being extended upwardly through the opening in said cap with the dropper tube projecting therebelow and the body of the bulb frictionally engaging the cap whereby adapting the dropper to move with the cap as a unit.

9. A combined bottle closure and liquid dropper comprising a rigid cap having a central opening in it and adapted to fit over and form a cover for the top of a bottle and a liquid dropper consisting of an externally flanged elastic bulb having a dropper tube engaged in an open neck forming the bottom of the bulb, the diameter of said opening in the cap being at least approximately as great as the external diameter of the upper or squeezing portion of the bulb, one of said tube and neck being provided with a groove and the other thereof being provided with a flange interengaging said groove, the external flange of the bulb being disposed substantially at the bottom of the bulb so that no substantial portion of the bulb extends down into the bottle and about the region of the interengaging portions of the tube and neck to enhance the engagement therebetween and being of such diameter as to seat on the bottle to seal the same upon application of the cap thereto, said bulb being extended upwardly through the opening in said cap with the dropper tube projecting therebelow and the body of the bulb frictionally engaging the cap whereby adapting the dropper to move with the cap as a unit.

TUNIS J. DYKEMA.